No. 729,010. PATENTED MAY 26, 1903.
P. SYNNESTVEDT.
VEHICLE DRIVING MECHANISM.
APPLICATION FILED OCT. 15, 1900.
NO MODEL.
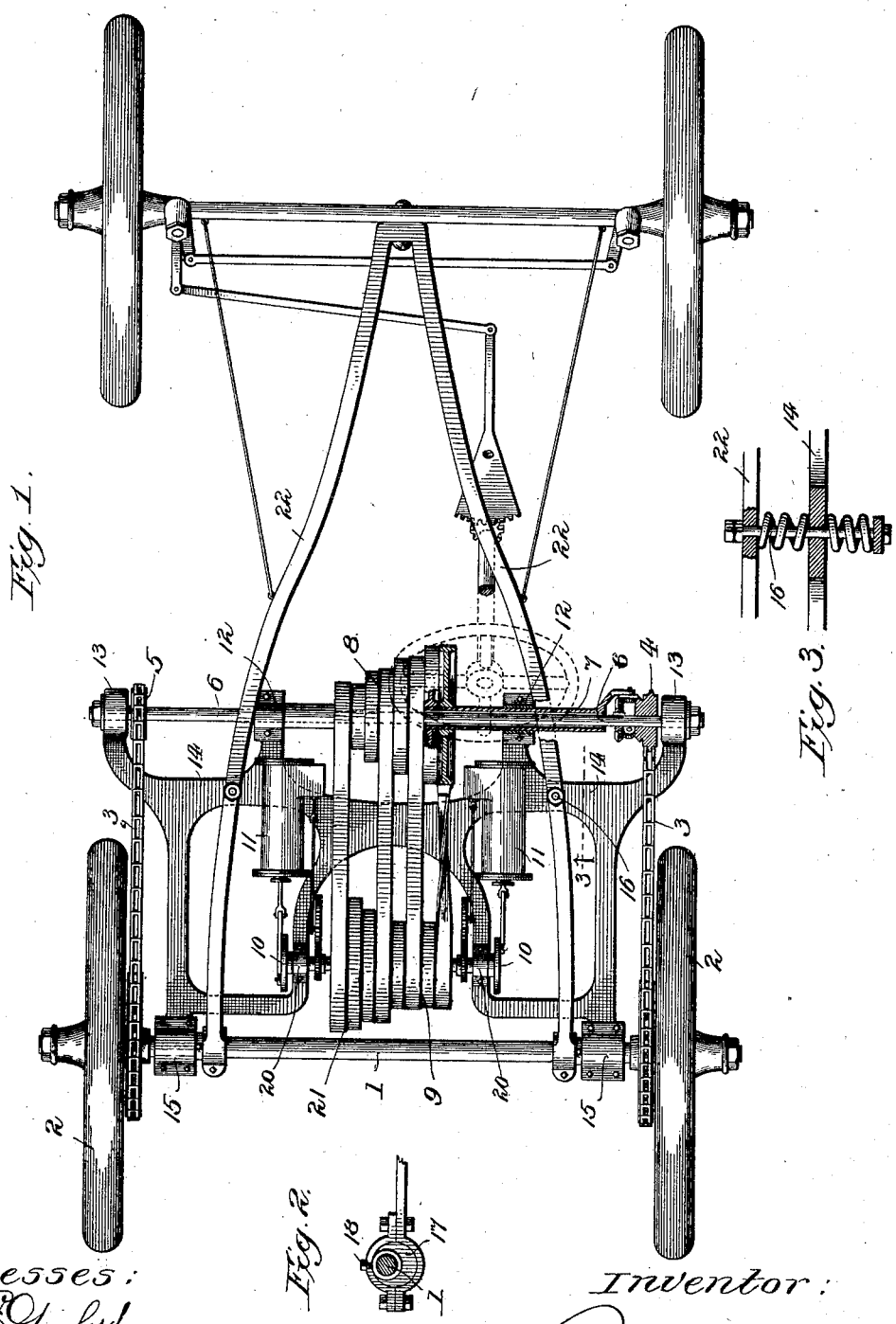

No. 729,010. Patented May 26, 1903.

UNITED STATES PATENT OFFICE.

PAUL SYNNESTVEDT, OF GLENVIEW, ILLINOIS.

VEHICLE DRIVING MECHANISM.

SPECIFICATION forming part of Letters Patent No. 729,010, dated May 26, 1903.

Application filed October 15, 1900. Serial No. 33,085. (No model.)

*To all whom it may concern:*

Be it known that I, PAUL SYNNESTVEDT, a citizen of the United States of America, residing at Glenview, in the county of Cook and State of Illinois, have invented certain new and useful Improvements in Vehicle Driving Mechanisms, of which the following, taken in connection with the accompanying drawings, is a specification.

This invention relates to driving mechanism for motor-vehicles, and particularly to the means employed for carrying the motor, the counter-shaft, and the connected parts employed in the transmission of the power.

The first of the objects of my invention relates to the provision, in combination with a fixed axle and a pair or rotatable driving-wheels, of a supporting-frame upon which is mounted a counter-shaft and also a motor and speed-changing gear connecting the motor-shaft with the counter-shaft.

A further object of my invention is the combination, with a driving-wheel and chain driving mechanism connecting the said driving-wheel with a counter-shaft carrying a differential gear, the counter-shaft being supported in bearings formed in a frame which is carried at one end in pivotal support upon the axle, about which rotates the driving-wheel.

Another object of my invention is the provision of a frame for carrying a counter-shaft and chain driving mechanism or belt devices for transmitting the motion of the counter-shaft to the driving-wheel and means for varying the position of the frame relative to the driving-axle, whereby the tension of the chain is suitably adjusted without throwing the bearings of the counter-shaft out of gear or changing the parallelism of the axis of the counter-shaft with relation to the axle which carries the driving-wheel.

The above, as well as such other objects as may hereinafter appear, I obtain by means of a construction which I have illustrated in preferred form in the accompanying drawings, in which—

Figure 1 is a plan view of a machine embodying my invention. Fig. 2 is a detail showing the arrangement of the adjusting mechanism for taking up the slack in the chain; and Fig. 3 is a sectional elevation of part of the mechanism, showing the means of supporting the outer or free end of the motor-carrying frame.

Referring now more particularly to Fig. 1, it will be seen that I have provided, first, a fixed or stationary axle 1, about which are a couple of driving-wheels 2, connected, by means of a driving-chain, with a couple of driving sprocket-wheels 4 and 5, one of which, 4, is rotatably mounted upon a shaft 6, the other end of which carries the other sprocket-wheel, 5, fixed to the shaft. Around the shaft 6 is arranged a tube 7, upon which is mounted one portion of the speed-changing gear 8, the other portion of the speed-changing gear 9 being carried by the motor-shaft 10. The motor-cylinders, which are indicated at 11, may be of any preferred construction, and, in fact, I do not desire to be understood as limiting myself in any way to any particular kind or type of motor. The tube 7 is provided with bearings 12 at each side of the speed-changing gear. The outer ends of the rods 6 are carried in bearings 13, which are formed in a frame 14, which also carries the bearings 12. The frame 14 is carried at the axle end by pivotal supports 15 and at the other end by the vehicle-frame 22 by means of springs arranged as shown at 16 or in some other similar manner, the springs being preferably fixed so that, as shown in Fig. 3, they will allow the frame 14 to yield both upwardly and downwardly.

The pivotal bearings 15 are arranged about the eccentric block 17, which is provided with set-screws 18, so that by loosening the set-screws and turning the block around the axle 1, as clearly shown in Fig. 2, the distance of the counter-shaft 6 from the axle can be varied to alter the tension or adjustment of the chain 3, this being accomplished, as will readily be seen, without disarranging the alinement of the shaft 6, the tube 7, or the bearings thereof and also without disarranging the parallelism between the counter-shaft and the axle that carries the driving-wheels.

The motor is preferably securely fastened upon the frame 14 in a position about as shown in Fig. 1, and the motor-shaft 10 is carried in bearings 20.

For convenience of illustration I have shown a speed-changing gear comprising a couple of cone-pulleys 21 and a series of belts arranged on tight and loose portions of said pulleys adapted to be shifted on and off for differences in speed or for reversing the direction of the vehicle. Other forms of speed-changing gear could be used, if preferred, without departing from the spirit of my invention.

From the foregoing description it is obvious that by my improved mechanism I secure a construction by which the motor and speed-changing mechanism are carried in a convenient and easily-accessible place and in a position where they have something of spring-support, while at the same time being so related to the driving-axle as to allow the mechanism to operate to the greatest advantage and without danger of the lines or axes of rotation becoming disarranged. It will also be seen that by mounting the counter-shaft and the motor-shaft on a frame which is common to both of the said shafts and having all of the supports for both the counter-shaft and the motor-shaft formed integral with or fast to the said frame there is no danger of any of the parts getting out of place with reference to each other other, and it is also to be observed that by the arrangement just described, in combination with the pivotal supports of the frame about the axle, there is no danger of the counter-shaft or the motor-shaft or any of the other mechanism becoming displaced with reference of the axial line of the driving-axle.

Another object of my invention will be seen to be the separation of the motor-frame and the connected mechanism from the main vehicle-frame 22, to which it is only connected by means of the spring suspension devices 16. This reduces the vibration felt upon the vehicle due to the motion of the motor to a minimum, as will readily be seen.

Having thus described my invention, what I claim as new, and desire to secure by Letters Patent, is—

1. A vehicle frame and axle in fixed relation, a pair of driving-wheels turning on the axle, a motor-frame pivotally supported by the axle and spring-supported from the vehicle-frame, a motor, a motor-shaft driven thereby and a counter-shaft carried by the motor-frame, connections between the motor-shaft and counter-shaft, and flexible driving connections from the counter-shaft directly to the said driving-wheels, substantially as described.

2. A vehicle frame and axle, a pair of driving-wheels rotatably mounted on the axle, a motor-frame pivotally supported by the axle and spring-supported from the vehicle-frame, a motor, a motor-shaft driven thereby and a counter-shaft carried by the motor-frame, connections between the motor-shaft and counter-shaft, and driving connections from the counter-shaft directly to the said driving-wheels, substantially as described.

3. A vehicle driving mechanism comprising a vehicle-frame, a fixed axle, a driving-wheel rotatable on said axle, a driving-shaft frame, supports for one end of said driving-shaft frame, pivotally engaging said axle, the other end of said driving-shaft frame being supported from the vehicle-frame, a flexible driving connection from said driving-shaft directly to said driving-wheel, said pivotal supports for the driving-shaft frame being provided with take-up mechanism, whereby to adjust the slack of said flexible driving connection, substantially as described.

4. A vehicle driving mechanism comprising a pair of driving-wheels, an axle therefor, a vehicle-frame supported at one end upon said axle, a motor, a motor-shaft, a counter-shaft, a frame carrying said motor and said counter-shaft, pivotal supports between the driving-axle and the motor-frame, and spring connections between the other end of said motor-frame and said vehicle-frame, substantially as described.

5. A vehicle driving mechanism comprising a pair of driving-wheels, a non-rotatable driving-wheel axle, a motor-shaft, a counter-shaft, the motor-shaft and counter-shaft being both carried by a frame pivotally supported at one end on the driving-axle and at the other end carried by a spring-support, and devices for transmitting the movement of the motor-shaft to the counter-shaft, and devices for transmitting the movement of the counter-shaft to the driving-wheels, substantially as described.

6. A vehicle driving mechanism comprising a vehicle-frame, a fixed axle, a driving-wheel rotatable on said axle, a driving-shaft frame pivotally carried on the axle at one end and spring-supported from the vehicle-frame at the other end, a driving-shaft in said frame having outside end supports therein, and a driving connection from said driving-shaft directly to said driving-wheel, substantially as described.

7. A vehicle driving mechanism comprising a pair of driving-wheels, an axle therefor, a vehicle-frame supported at one end upon said axle, a motor, a motor-shaft, a counter-shaft, a frame carrying said motor and said counter-shaft, pivotal supports for one end of said frame upon said axle, and connections between the other end of said frame and said vehicle-frame, a driving-chain for transmitting power from said counter-shaft to said driving-wheels, and bearings for the outer ends of said counter-shaft extending between the sprockets carrying said driving-chain, substantially as described.

8. A vehicle driving mechanism comprising a pair of driving-wheels, an axle therefor, chains arranged to drive said wheels, a shaft connected with so as to drive said chains, and supports for said shaft extending between the two oppositely-moving parts of said chains, substantially as described.

9. A vehicle driving mechanism comprising a pair of driving-wheels, an axle therefor, connections arranged to drive said wheels, a shaft connected with so as to drive said connections, and supports carrying said shaft at its outer ends, substantially as described.

10. A vehicle driving mechanism comprising a pair of driving-wheels, an axle therefor, flexible connections arranged to drive said wheels, a shaft connected with so as to drive said flexible connections, and supports carrying said shaft at its outer ends beyond the points of support of the driving connections, substantially as described.

11. A vehicle driving mechanism comprising a pair of driving-wheels, an axle therefor, chains arranged to drive said wheels, a shaft connected with so as to drive said chains, a supporting-frame carrying said shaft at its outer ends, a vehicle-frame, and spring connection between said supports and said vehicle-frame, substantially as described.

12. A vehicle driving mechanism comprising a pair of driving-wheels, an axle therefor, chains arranged to drive said wheels, a shaft connected with so as to drive said chains, supports carrying said shaft at its outer ends, a vehicle-frame, and spring connection between said supports and said vehicle-frame, one end of the supports being attached directly to the axle, substantially as described.

In testimony whereof I have hereunto set my hand in the presence of two subscribing witnesses.

PAUL SYNNESTVEDT.

In presence of—
PAUL CARPENTER,
IRVIN H. JONES.